Jan. 22, 1952  W. H. T. HOLDEN  2,583,102

COUNTING SYSTEM

Filed July 24, 1950

INVENTOR
W. H. T. HOLDEN
BY
R. O. Covell
ATTORNEY

Patented Jan. 22, 1952 2,583,102

UNITED STATES PATENT OFFICE 2,583,102

COUNTING SYSTEM

William H. T. Holden, Woodside, N. Y., assignor to Bell Telephone Laboratories, Incorporated, New York, N. Y., a corporation of New York Application July 24, 1950, Serial No. 175,574

15 Claims. (Cl. 250—27)

Figures 1, 2:
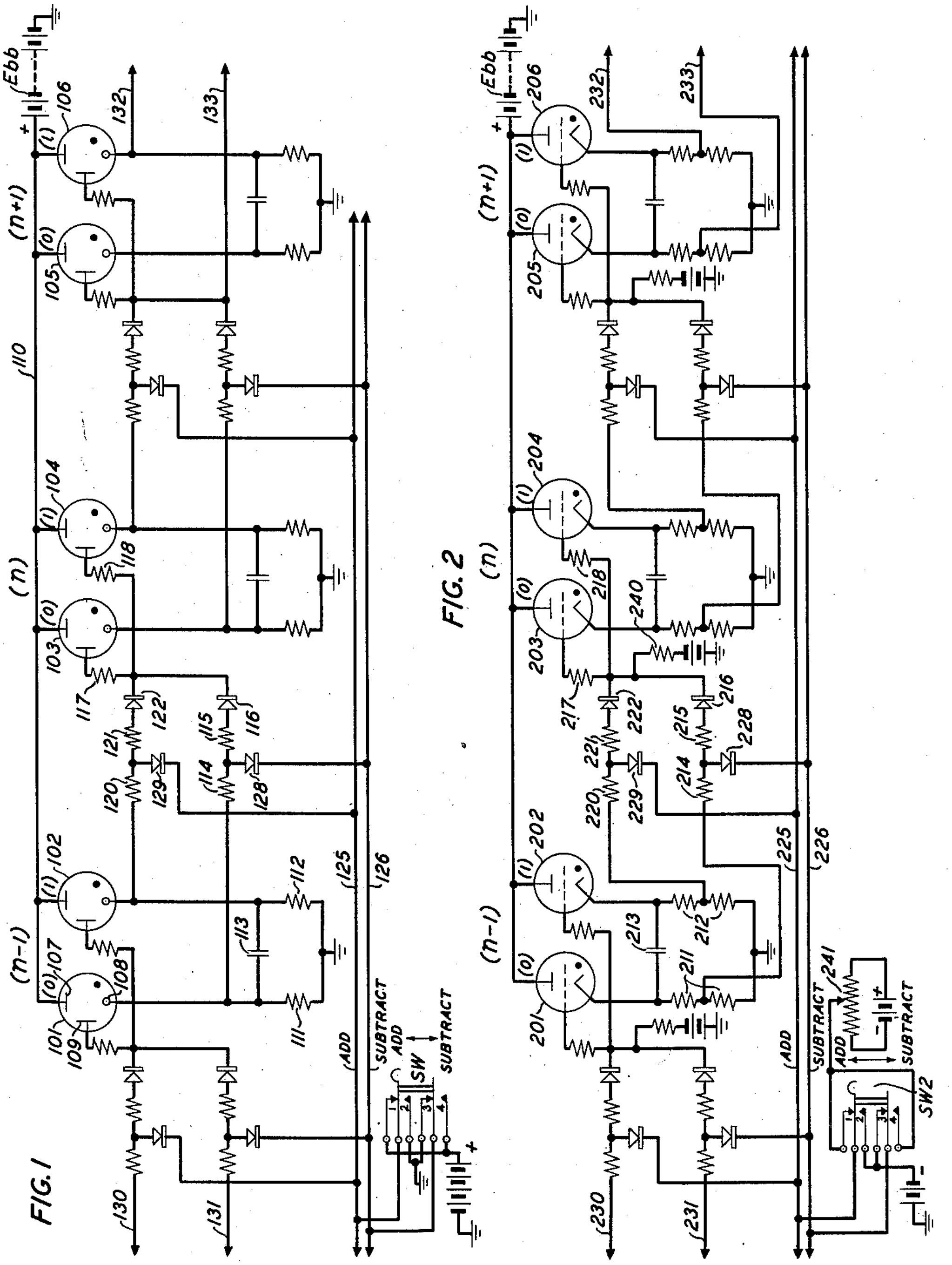

This invention relates to counting systems and more particularly to circuits for counting electrical pulses.

An object of this invention is the accurate counting of electrical phenomena recurring at high rates of speed.

A feature of this invention is a bidirectional counter operable to count in either of two directions, i. e., either to count or to uncount; either to add or substract.

Another feature of this invention is the use of unidirectional current conducting devices as gating means with means for externally controlling the effective impedance of the gates to pulses applied thereto.

The manner in which the object is attained and a more complete understanding of the listed and other features of the invention may be obtained from the following detailed description of preferred embodiments of the invention when read with reference to the accompanying drawings in which:

Fig. 1 is a circuit diagram of one form of the invention, utilizing cold cathode gaseous discharge devices; and Fig. 2 is a circuit diagram of another form of the invention, utilizing hot cathode gaseous discharge devices or thyratrons.

Let the fundamental principles governing the design of a bidirectional or add-subtract binary counting circuit first be considered. Every integer on a decimal basis may be represented as the summation of discrete powers of the digit 2. Thus, as is demonstrated in the following table, the decimal integer 1 may be represented as the zero power of the digital base 2; the decimal integer 5 may be represented as the summation of the second and the zero powers of the digital base 2; the decimal integer 15 may be represented as $2^3+2^2+2^1+2^0$, and so on.

| Decimal Number | Binary Number | | | | |
|---|---|---|---|---|---|
| | $2^4$ | $2^3$ | $2^2$ | $2^1$ | $2^0$ |
| 0 | 0 | 0 | 0 | 0 | 0 |
| 1 | 0 | 0 | 0 | 0 | 1 |
| 2 | 0 | 0 | 0 | 1 | 0 |
| 3 | 0 | 0 | 0 | 1 | 1 |
| 4 | 0 | 0 | 1 | 0 | 0 |
| 5 | 0 | 0 | 1 | 0 | 1 |
| 6 | 0 | 0 | 1 | 1 | 0 |
| 7 | 0 | 0 | 1 | 1 | 1 |
| 8 | 0 | 1 | 0 | 0 | 0 |
| 9 | 0 | 1 | 0 | 0 | 1 |
| 10 | 0 | 1 | 0 | 1 | 0 |
| 11 | 0 | 1 | 0 | 1 | 1 |
| 12 | 0 | 1 | 1 | 0 | 0 |
| 13 | 0 | 1 | 1 | 0 | 1 |
| 14 | 0 | 1 | 1 | 1 | 0 |
| 15 | 0 | 1 | 1 | 1 | 1 |
| 16 | 1 | 0 | 0 | 0 | 0 |

In a binary counter, $n$ stages are normally provided with the condition of the successive stages being representative of the presence or absence of the successive powers of 2 in the integer counted, i. e., $2^0$, $2^1$, $2^2$ . . . $2^n$. Further, each stage of a binary counter is normally in either one or the other of two stable conditions, one of said conditions arbitrarily being designated the "on" state, and the other arbitrarily being designated the "off" state. In the above table, "1" may be understood to represent the "on" state of the appropriate stage, and "0" may be understood to represent the "off" state of the stage.

Referring again to the above table, it will be observed that the first or "units" or $2^0$ element always shifts to its other condition each time the decimal numeral 1 is either added to or subtracted from the prior registration. Thus the first or "units" or $2^0$ stage of the counter must always shift its state whenever a pulse is applied to the system whether the operation be addition or subtraction.

Now considering the second or "2s" or $2^1$ stage of the counter, in the process of addition: If the $2^1$ stage be "off" or "at 0" and the first or $2^0$ stage "on" or "at 1," a received pulse must advance the $2^0$ stage to 0 and the $2^1$ stage to 1. Similarly, if the $2^1$ stage be "on" or "at 1" and the first or $2^0$ stage also be 1, a received pulse must advance the $2^0$ stage to 0 and the $2^1$ stage to 0 and also must change the state of the third or $2^2$ stage. If the $2^2$ stage were previously at 1, this pulse must also shift the $2^3$ stage, and if the $2^3$ stage were also at 1 so that the shift is to 0, the $2^4$ stage must also be shifted, and so on. Obviously, in the process of addition, if the first or units stage be at 0, only the state of that first stage need be shifted.

In the process of subtraction: If the units or $2^0$ stage is on 1 when a pulse is received, only the state of that stage need be shifted. If the units or $2^0$ stage be on 0, then the pulse must also shift the state of the $2^1$ stage, and if that stage was previously on 0 whereby this pulse shifts it to the 1 state, then the state of the next succeeding or $2^2$ stage must also be shifted, and so on.

Deriving a general proposition from the above considerations, in the process of addition, the $n$th counter (which counts the $n$th power of 2) must advance from state 0 to state 1 whenever the $n-1$ counter advances from state 1 to state 0, but the $n$th stage should be non-responsive to a shift of the $n-1$ stage from the 0 state to the 1 state. In the process of subtraction, the $n$th counter must move from state 0 to state 1 whenever the $n-1$ counter moves from state 0 to state 1, and must also cause the next succeeding or $n+1$ stage to shift its state. When the $n-1$ counter moves from state 0 to state 1 with the $n$th stage at state 1, the $n$th stage must move from state 1 to state 0 in the process of subtraction, but no effect should be produced in the $n$th or higher stages.

The design of a bidirectional binary counter may be predicated on the above-developed propositions. It will be seen that the first or $2^0$ stage may be driven directly from the pulse source since its state must be reversed at each pulse. Two output paths are provided coupling the first or $2^0$ stage to the next or $2^1$ stage. A pulse is transmitted over one of these paths when the first or $2^0$ stage advances from its 0 to its 1 state, and a pulse is transmitted over the other of these paths when the first or $2^0$ stage passes from its 1 to its 0 state. Two control conductors are provided with the potentials on those conductors being selected in accordance with whether addition or subtraction is to be performed. Gates controlled by the voltages impressed on these two control conductors determine which of the two pulses transmitted from the $2^0$ stage is applied to the next or $2^1$ stage. All higher stages are similarly equipped with dual outputs, with a gate individual to each of the outputs and with the condition of the gates being controlled by the voltages on the control conductors.

Referring now to Fig. 1 of the drawings, three stages of a bidirectional binary counting system are represented, designated, respectively, $n-1$, $n$, and $n+1$. Each stage comprises a trigger circuit having two stable states. In the embodiment of the invention shown in Fig. 1, each trigger circuit comprises a pair of cold cathode gaseous discharge devices which may, for example, be of the type designated WE 376-B or RCA 5823. Each tube is provided with an anode, a cathode, and a start electrode, e. g., tube 101 in stage $n-1$ is provided with an anode 107, a cathode 108, and a start electrode 109. The anodes of all of the tubes are connected via conductor 110 to a positive source of potential $Ebb$ which may provide, for example, 135 volts. The cathode of each tube is connected to ground (negative $Ebb$) through an individual resistor. Thus, the cathode 108 of tube 101 is grounded through resistor 111 and the cathode of tube 102 is grounded through resistor 112. The cathodes of the two tubes comprising each trigger circuit are interconnected by a capacitor, e. g., the cathodes of tubes 101 and 102 are interconnected by capacitor 113.

Considering now, for example, the $n-1$ stage comprising tubes 101 and 102, let it be assumed that one of the tubes of the trigger pair, such as the 0 tube 101, is conducting while the other tube in the trigger pair, such as the 1 tube 102 is extinguished. The anodes of both tubes will obviously remain at the plate supply voltage $Ebb$, viz., 135 volts, and the cathode of the non-conducting tube 102 will be stabilized at approximately ground potential. The cathode of the conducting tube 101, however, will rise to a value less than the supply voltage $Ebb$ by an amount equal to the main gap sustaining voltage of the tube, i. e., $Ebb-Es$. In the above-noted type of tube, $Es$ is typically in the vicinity of 70 volts so that the cathode of the conducting tube will rise to 135−70 or 65 volts positive relative to ground. This potential must be less than the start-gap breakdown voltage of the tubes for a reason hereinafter to be noted and the value of $Ebb$ may be adjusted so to provide. It will herein be assumed that the start-gap breakdown voltage of the tubes is in the vicinity of 100 volts.

It will be seen that as a result of the trigger circuit comprising tubes 101 and 102 being in this stable state, i. e., the 0 state, capacitor 113 will assume a charge of approximately 65 volts, with the left-hand electrode of capacitor 113 being approximately 65 volts positive relative to the right-hand electrode thereof.

If a positive pulse of suitable amplitude be impressed on the start electrodes of both of these tubes in a manner hereinafter to be discussed, the pulse will have little or no effect on the presently conducting 0 tube 101, but it will initiate a discharge in the presently non-conducting 1 tube 102 between the start electrode and the cathode thereof. This discharge, by the nature of the tube and the applied voltages, will immediately transfer so as to exist between the main anode and the cathode. As a result, the cathode of tube 102 will immediately rise to a potential $Ebb-Es$ or 65 volts positive. Since capacitor 113 has already been charged to $Ebb-Es$ or 65 volts positive as above described, the left-hand electrode of capacitor 113, and consequently the cathode 108 of tube 101, will attain transiently a potential of $2(Ebb-Es)$ or 130 volts positive relative to ground. Therefore, during this transient period, the cathode of the previously non-conducting tube 102 will rise to 65 volts positive and the cathode of the previously conducting tube 101 will rise to 130 volts positive. These potentials are employed in controlling the state of the next succeeding stage in a manner hereinafter to be described.

During the transient condition, the cathode of tube 101 rises momentarily to approximately 130 volts positive relative to ground as above noted. Since the anode of tube 101 is at positive 135 volts, the potential difference across this main gap is considerably below the sustaining voltage of the tube, and tube 101 will be extinguished whereby the $n$—1 stage will rest in its "1" stable state.

The cathodes of each tube in each stage are coupled to the start electrodes of the tubes in the next succeeding stage. Thus, the cathode 108 of tube 101 is connected through resistors 114 and 115, varistor 116, through resistor 117 to the start electrode of tube 103 and through resistor 118 to the start electrode of tube 104. Similarly, the cathode of tube 102 is connected through resistors 120 and 121, varistor 122, through resistor 117 to the start electrode of tube 103 and through resistor 118 to the start electrode of tube 104. The varistors represented in the drawings are unidirectional current conducting devices and may comprise conventional "dry" rectifiers, gas diodes, etc. The varistors are represented as having a low impedance to conventional current flow in the direction of the arrow when the arrow sides thereof are at a potential positive relative to the other sides.

Two control leads are provided. They are designated, respectively, the "add" lead 125 and the "subtract" lead 126. At a point intermediate the two resistors 114 and 115, the circuit coupling the cathode of tube 101 to the start electrodes of the tubes in the next stage is connected to the "subtract" lead 126 by means of a varistor 128. Similarly, at a point intermediate the two resistors 120 and 121, the circuit coupling the cathode of tube 102 to the start electrodes of the tubes in the next stage is connected to the "add" lead 125 by means of a varistor 129. It will be noted that the varistors or gates 128 and 129 are poled with their arrows directed towards the control conductors.

Selected potentials are applied to the control conductors 125 and 126 in accordance with whether the operation of addition or subtraction is to be performed. These potentials are normally applied under the control of other circuitry not shown. A switch SW may be utilized to produce the desired result. This switch functions in an obvious manner to connect a positive potential, such as positive 120 volts to the "add" lead 125, and to ground the "subtract" lead 126 if the process of addition is to be performed, and to reverse these connections if the process of subtraction is to be performed.

Assume that the process of addition is to be performed and that the $n-1$ stage is now in the transient condition incident to a change from its 0 to its 1 state as above described. As above noted, during this transient period the cathode of tube 102 is at approximately 65 volts positive relative to ground. This potential therefore appears at the arrow side of varistor 129. The other side of varistor 129 is connected to the "add" lead 125 and therefore is at a 120-volt positive potential. Therefore, varistor 129 presents a high impedance to the potential at the cathode of tube 102. As a result, the full 65-volt potential will be applied through resistors 120 and 121, through varistor 122, through resistor 117 to the start electrode of tube 103 and through resistor 118 to the start electrode of tube 104. As previously noted, however, a 65-volt potential applied to the start electrodes of these tubes is ineffective to initiate a discharge since the start-gap breakdown voltage is considerably above this potential.

During this transient condition of the $n-1$ stage, the cathode of tube 101 is momentarily at a 130-volt positive potential as previously noted. This potential, if applied through resistors 114 and 115, through varistor 116 and through resistors 117 and 118, respectively, to the start electrodes of tubes 103 and 104 would be sufficient to shift the state of that trigger circuit. However, the lower electrode of varistor 128 is grounded through the "subtract" lead 126 so that varistor 128 constitutes a low impedance shunting path for the potential at the cathode of tube 101 and consequently no pulse will be applied to the start electrodes of tubes 103 and 104 from the cathode of tube 101 during the process of addition and during the transfer from the 0 to the 1 state of the $n-1$ stage. This accords with the previously developed propositions.

Considering now the same shift in state of the $n-1$ stage, i. e., from state 0 to state 1, but assume that subtraction is to occur whereby the "add" lead 125 is grounded, and whereby the "subtract" lead 126 is supplied with a positive 120-volt potential through the No. 4 contact of switch SW. In accordance with the previously developed principles, in the process of subtraction if the $n-1$ stage shifts from its 0 to its 1 state, the state of the next or $n$th stage should also be shifted. In the circuit of Fig. 1, therefore, under these conditions, the 65-volt potential at the cathode of tube 102 is shunted to ground through varistor 129. However, since the cathode of tube 101 and consequently the arrow side of varistor 128 is transiently at 130 volts and since the other side of varistor 128 is connected to a positive 120-volt potential on conductor 126, the pulse from the cathode of tube 101 will be clipped to 120 volts and will then be applied through resistor 115, varistor 116 and through resistors 117 and 118, respectively, to the start electrodes of tubes 103 and 104. As a result, the previously non-conducting one of that pair of tubes will be discharged and the previously conducting one of that pair of tubes will be extinguished, with a corresponding change of cathode potentials which will be applied to the corresponding coupling networks connecting the $n$th stage to the next succeeding or $n+1$ stage.

The necessity of providing varistors 116 and 122 will now be apparent. Under the conditions just discussed, were it not for the presence of varistor 122, poled as shown, the 120-volt pulse transmitted through resistor 115 would be shunted to ground through resistor 121 and varistor 129.

Assume now that the shift of the $n-1$ stage was from the 1 state to the 0 state rather than the previously discussed converse situation. Under the principles of the operation of the trigger circuit hereinbefore discussed, the cathode of tube 101 will rise to 65 volts positive and the cathode of tube 102 will transiently rise to $2(Ebb-Es)$ or 130 volts, the reverse of the previous situation. Under the previously developed general propositions, in the process of addition, when any stage shifts from its 1 to its 0 state, the state of the next succeeding stage should also be shifted, but during the process of subtraction, the state of the next succeeding stage should not be shifted. Therefore, in the process of addition wherein the lower electrode of varistor 129 is connected to positive 120-volt battery through conductor 125 and wherein the lower electrode of varistor 128 is grounded through conductor 126, the 65-volt potential at the cathode of tube 101 will be shunted to ground through varistor 128, but varistor 129 will only serve to clip the transient 130-volt potential at the cathode of tube 102 to 120 volts and this clipped pulse will be applied to the start electrodes of tubes 103 and 104 to shift the state of the $n$th stage.

It will again be noted that were it not for the presence of varistor 116, poled as shown, the 120-volt pulse transmitted through resistor 121 would be shunted to ground through resistor 115 and varistor 128.

In the process of subtraction, the reverse conditions exist wherein the lower electrode of varistor 129 is grounded through conductor 125 and the lower electrode of varistor 128 is at a positive 120-volt potential. Therefore, the transient 130-volt potential at the cathode of tube 102 will be shunted to ground through varistor 129 and the 65-volt potential at the cathode of tube 101 will be applied through the coupling network to the start electrodes of the tubes in the next succeeding trigger circuit, but this potential is of insufficient amplitude to shift the state of the $n$th stage as hereinbefore discussed.

The circuity of the several stages is identical. Therefore, the manner in which the state of the $n-1$ stage is shifted is identical to that above described in relation to the $n$th stage, and conductors 130 and 131 may be connected to the cathodes of the tubes comprising the next preceding or $n-2$ stage. Similarly, conductors 132 and 133 may be connected through coupling networks to the stage next succeeding stage $n+1$, i. e., to stage $n+2$, not shown. It will be recalled, however, that the first or units or $2^0$ stage should be driven directly from the pulse source whereby the state of that first stage is reversed at every pulse whether the process of addition or of subtraction is to be performed.

The speed capabilities of the disclosed counting circuit may be increased by the use of thyratrons or hot cathode gaseous discharge devices rather than the cold cathode gaseous discharge devices shown in Fig. 1. Fig. 2 demonstrates this modification. The circuits of Figs. 1 and 2 are substantially operationally identical, the only modifications in the circuitry of Fig. 2 being those necessary to compensate for the different voltage requirements of the thyratron. Thus, for example, the cathodes of tubes 201 and 202 are grounded through resistors 211 and 212, respectively, and the anodes of all of the tubes are connected to a source of positive potential *Ebb* which, in this case, may have a wider latitude, e. g., from 135 to 250 volts. Only a part of the pulse across the cathode resistors 211 and 212 need be used since the rise in cathode potential when one of the thyratrons 201 to 206 is discharged is large, the sustaining voltage *Es* of a thyratron being normally in the range of approximately 7 to 20 volts so that *Ebb—Es* closely approaches *Ebb*. Therefore, the networks coupling any stage to the next succeeding stage are tapped to a point on the cathode resistors rather than directly to the cathodes. Additionally, by the nature of the thyratron, the grids must be biased negatively relative to the cathodes to prevent conduction. Thus, the grids of tubes 203 and 204 are connected through individual resistors 217 and 218 and through common resistor 240 to negative battery which may supply, for example, negative 50 volts.

Similarly, because of the differences between the characteristics of cold cathode triodes and thyratrons, the voltage supplied through the No. 3 contact of switch SW2 to the "subtract" lead 226 during the process of addition and through the No. 2 contact of switch SW2 to the "add" lead 225 during the process of subtraction is approximately 50 volts negative. The voltage supplied through the No. 1 contact of switch SW2 to the "add" lead 225 during the process of addition and through the No. 4 contact of switch SW2 to the "subtract" lead 226 during the process of subtraction is approximately 10 volts positive as obtained from the voltage divider 241.

Considering these differences in applied voltages, the operation of the circuit of Fig. 2 is the same as the operation of the circuit of Fig. 1, above described in detail, and the reference characters referring to the corresponding elements in the two figures have corresponding tens and units digits.

It is to be understood that the above-described arrangements are but illustrative of the application of the principles of the invention. Numerous other arrangements may be devised by those skilled in the art without departing from the spirit and scope of the invention.

What is claimed is:

1. In a counting circuit, two control conductors, a plurality of stages, first and second means interconnecting adjacent ones of said stages, a unidirectional current conducting device connecting said first means to one of said control conductors, and another unidirectional current conducting device connecting said second means to the other of said control conductors.

2. In a counting circuit, a plurality of trigger circuits, means interconnecting adjacent ones of said trigger circuits, an add lead, a subtract lead, and unidirectional current conducting means connecting said means to said add lead and to said subtract lead.

3. In a counting circuit, a plurality of trigger circuits, an add lead, a subtract lead, first and second means interconnecting adjacent ones of said trigger circuits, a unidirectional current conducting device connecting said first means to said add lead, and another unidirectional current conducting device connecting said second means to said subtract lead.

4. In a counting circuit, a plurality of pairs of electron discharge devices, first means connecting one of the devices in each of the pairs to the next succeeding one of said pairs of devices, second means connecting the other one of the devices in each of the pairs to the next succeeding one of said pairs of devices, two control conductors, unidirectional current conducting means connecting said first means to one of said control conductors, and unidirectional current conducting means connecting said second means to the other of said control conductors.

5. In a counting circuit, a plurality of pairs of electron discharge devices, each of said devices having at least a cathode and a start electrode, first means connecting the cathode of one of the devices in each of the pairs to the start electrodes in the next succeeding pair of devices, second means connecting the cathode of the other of the devices in each of the pairs to the start electrodes in the next succeeding pair of devices, two control conductors, unidirectional current conducting means connecting said first means to one of said conductors, and unidirectional current conducting means connecting said second means to the other of said conductors.

6. In a counting circuit, a plurality of pairs of electron discharge devices, each of said devices having at least a cathode and a start electrode, a capacitor interconnecting the cathodes of the devices in each of said pairs of devices, first means connecting the cathode of one of the devices in each of the pairs to the start electrodes in the next succeeding pair of devices, second means connecting the cathode of the other of the devices in each of the pairs to the start electrodes in the next succeeding pair of devices, two control conductors, unidirectional current conducting means connecting said first means to one of said conductors, and unidirectional current conducting means connecting said second means to the other of said conductors.

7. In a counting circuit, two control conductors, a plurality of stages, means including unidirectional current conducting means interconnecting adjacent ones of said stages, and unidirectional current conducting means connecting said means to said control conductors.

8. In a counting circuit, two control conductors, a plurality of stages, first and second means including unidirectional current conducting means interconnecting adjacent ones of said stages, a unidirectional current conducting device connecting said first means to one of said control conductors, and another unidirectional current conducting device connecting said second means to the other of said control conductors.

9. In a counting circuit, a plurality of pairs of electron discharge devices, first means including unidirectional current conducting means connecting one of the devices in each of the pairs to the next succeeding one of said pairs of devices, second means including unidirectional current conducting means connecting the other one of the devices in each of the pairs to the next succeeding one of the said pairs of devices, two control conductors, unidirectional current conducting means connecting said first means to one of said control conductors, and unidirectional current conducting means connecting said second means to the other of said control conductors.

10. In a counting circuit, a plurality of pairs of electron discharge devices, first means including two resistors and unidirectional current conducting means connecting one of the devices in each of the pairs to the next succeeding one of said pairs of devices, second means including two resistors and unidirectional current conducting means connecting the other one of the devices in each of the pairs to the next succeeding one of said pairs of devices, two control conductors, unidirectional current conducting means connecting said first means at a point intermediate said two resistors to one of said control conductors, and unidirectional current conducting means connecting said second means at a point intermediate said two resistors to the other of said control conductors.

11. In a counting circuit, a plurality of pairs of electron discharge devices each having at least a cathode, a capacitor interconnecting the cathodes of the devices in each of said pairs of devices, first means including unidirectional current conducting means connecting one of the devices in each of the pairs to the next succeeding one of said pairs of devices, second means including unidirectional current conducting means connecting the other one of the devices in each of the pairs to the next succeeding one of said pairs of devices, two control conductors, unidirectional current conducting means connecting said first means to one of said control conductors, and unidirectional current conducting means connecting said second means to the other of said control conductors.

12. In a counting circuit, a plurality of pairs of electron discharge devices, each of said devices having at least a cathode and a start electrode, first means including unidirectional current conducting means connecting the cathode of one of the devices in each of the pairs to the start electrodes in the next succeeding pair of devices, second means including unidirectional current conducting means connecting the cathode of the other of the devices in each of the pairs to the start electrodes in the next succeeding pair of devices, two control conductors, unidirectional current conducting means connecting said first means to one of said conductors, and unidirectional current conducting means connecting said second means to the other of said conductors.

13. In a counting circuit, a plurality of pairs of electron discharge devices, each of said devices having at least a cathode and a start electrode, first means including two resistors and unidirectional current conducting means connecting the cathode of one of the devices in each of the pairs to the start electrodes in the next succeeding pair of devices, second means including two resistors and unidirectional current conducting means connecting the cathode of the other of the devices in each of the pairs to the start electrodes in the next succeeding pair of devices, two control conductors, unidirectional current conducting means connecting said first means at a point intermediate said two resistors to one of said conductors, and unidirectional current conducting means connecting said second means at a point intermediate said two resistors to the other of said conductors.

14. In a counting circuit, a plurality of pairs of electron discharge devices, each of said devices having at least a cathode and a start electrode, a capacitor interconnecting the cathodes of the devices in each of said pairs of devices, first means including unidirectional current conducting means connecting the cathode of one of the devices in each of the pairs to the start electrodes in the next succeeding pair of devices, second means including unidirectional current conducting means connecting the cathode of the other of the devices in each of the pairs to the start electrodes in the next succeeding pair of devices, two control conductors, unidirectional current conducting means connecting said first means to one of said conductors, and unidirectional current conducting means connecting said second means to the other of said conductors.

15. In a counting circuit, a plurality of pairs of electron discharge devices, each of said devices having at least a cathode and a start electrode, a capacitor interconnecting the cathodes of the devices in each of said pairs of devices, first means including two resistors and unidirectional current conducting means connecting the cathode of one of the devices in each of the pairs of the start electrodes in the next succeeding pair of devices, second means including two resistors and unidirectional current conducting means connecting the cathode of the other of the devices in each of the pairs to the start electrodes in the next succeeding pair of devices, two control conductors, unidirectional current conducting means connecting said first means at a point intermediate said two resistors to one of said conductors, and unidirectional current conducting means connecting said second means at a point intermediate said two resistors to the other of said conductors.

WILLIAM H. T. HOLDEN.

REFERENCES CITED

The following references are of record in the file of this patent:

UNITED STATES PATENTS

| Number | Name | Date |
|---|---|---|
| 2,442,428 | Mumma | June 1, 1948 |
| 2,478,683 | Bliss | Aug. 9, 1949 |
| 2,482,932 | Pyatt et al. | Sept. 27, 1949 |
| 2,489,325 | Ridler | Nov. 29, 1949 |
| 2,502,443 | Dunn et al. | Apr. 4, 1950 |
| 2,535,303 | Lewis | Dec. 26, 1950 |